(12) United States Patent
Kitamura et al.

(10) Patent No.: US 11,634,510 B2
(45) Date of Patent: Apr. 25, 2023

(54) WATER-SOLUBLE CELLULOSE ETHER AND METHOD FOR PRODUCING THE SAME

(71) Applicant: Shin-Etsu Chemical Co., Ltd., Tokyo (JP)

(72) Inventors: Akira Kitamura, Joetsu (JP); Mitsuhiro Yoshida, Joetsu (JP); Mitsuo Narita, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 451 days.

(21) Appl. No.: 15/930,079

(22) Filed: May 12, 2020

(65) Prior Publication Data
US 2020/0362060 A1 Nov. 19, 2020

(30) Foreign Application Priority Data

May 15, 2019 (JP) .............................. JP2019-092062
Jul. 26, 2019 (JP) .............................. JP2019-138150

(51) Int. Cl.
  *C08B 11/20* (2006.01)
(52) U.S. Cl.
  CPC .................... *C08B 11/20* (2013.01)
(58) Field of Classification Search
  None
  See application file for complete search history.

(56) References Cited

U.S. PATENT DOCUMENTS

| | | | | |
|---|---|---|---|---|
| 2,422,572 A | * | 6/1947 | Lilienfeld | ............. D06P 1/0036 536/84 |
| 2,833,758 A | * | 5/1958 | Kohler | .................... C08B 11/20 536/85 |
| 5,589,589 A | | 12/1996 | Sponheimer et al. | |
| 6,593,468 B1 | * | 7/2003 | Lange | .................... A61Q 19/00 536/99 |
| 2017/0114203 A1 | * | 4/2017 | Narita | ..................... C08B 11/08 |
| 2018/0098941 A1 | * | 4/2018 | Kitaguchi | ............... C08B 11/20 |

(Continued)

FOREIGN PATENT DOCUMENTS

| | | |
|---|---|---|
| EP | 3205671 A1 | 8/2017 |
| EP | 2208774 A1 | 4/2018 |

(Continued)

OTHER PUBLICATIONS

European Search Report for EP Application No. 20174594.0 dated Sep. 25, 2020.

(Continued)

*Primary Examiner* — John J Figueroa
(74) *Attorney, Agent, or Firm* — Rimon, P.C.

(57) ABSTRACT

There are provided a method for efficiently producing a water-soluble cellulose ether without using a special apparatus, and a novel water-soluble cellulose ether. More specifically, there are provided a method for producing a water-soluble cellulose ether including a first pulverization step of pulverizing a starting water-soluble cellulose ether to obtain a first pulverization product, and a first sieving step of sieving the first pulverization product by using a first sieve whose mesh surface is coated with an inorganic metal compound to obtain a first-sieve-passed water-soluble cellulose ether fraction; and a novel water-soluble cellulose ether.

5 Claims, 1 Drawing Sheet

(56) References Cited

U.S. PATENT DOCUMENTS

2018/0100027 A1\* 4/2018 Hirama ..................... C08B 3/14
2018/0100028 A1\* 4/2018 Yokosawa ............ A61K 9/2054
2019/0010252 A1   1/2019 Kitamura et al.

FOREIGN PATENT DOCUMENTS

| EP | 3308774 A1   | 4/2018 |
| EP | 3308775 A1   | 4/2018 |
| EP | 3309179 A1   | 4/2018 |
| JP | 2018-062652 A | 4/2018 |
| JP | 2019-014876 A | 1/2019 |
| JP | 2019-023272 A | 2/2019 |

OTHER PUBLICATIONS

Japanese Office Action dated Aug. 2, 2022, for Japanese Application No. 2019-138150 (3 pages).
Translation of Japanese Office Action dated Aug. 2, 2022, for Japanese Application No. 2019-138150 (3 pages).

\* cited by examiner

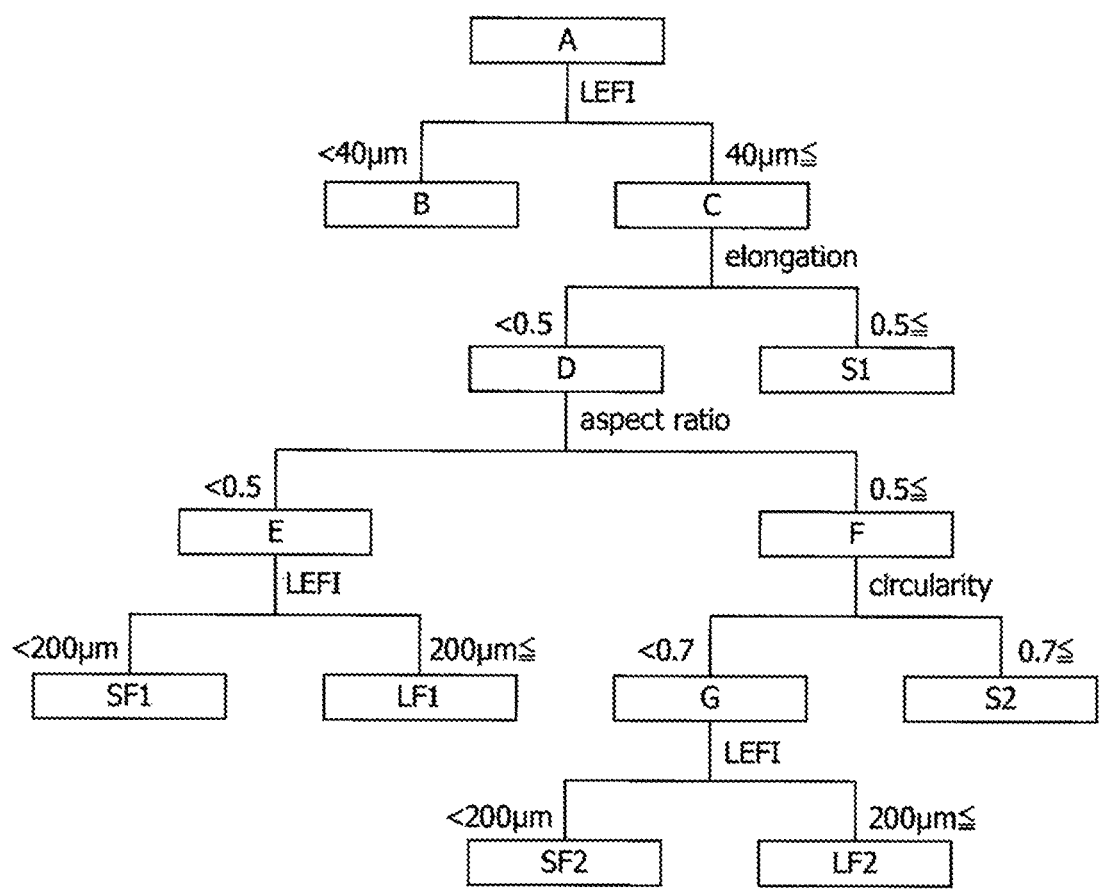

WATER-SOLUBLE CELLULOSE ETHER AND METHOD FOR PRODUCING THE SAME

CROSS REFERENECE TO RELATED APPLICATIONS

The present application is a Non-provisional Application, which claims priority to Japanese Application No. 2019-092062 filed May 15, 2019 and Japanese Application No. 2019-138150 filed Jul. 26, 2019, the contents of the above application are incorporated by reference herein in their entireties.

BACKGROUND OF THE INVENTION

1. Field of the Invention

The invention relates to a water-soluble cellulose ether used in the fields of building materials, chemicals, pharmaceuticals, foods and the like; and a method for producing the same.

2. Related Art

A water-soluble cellulose ether has conventionally been used as a binder for pharmaceuticals and foods, a disintegrant, a thickener for various solvents, a water retention agent for building materials, a binder in extrusion molding, a suspension stabilizer, and the like. For example, a water-soluble cellulose ether such as methyl cellulose and hydroxypropyl cellulose exhibits surface activity due to the presence of hydrophilic groups and hydrophobic groups in the molecule, and is also used as a suspension stabilizer in suspension polymerization of vinyl chloride or vinylidene chloride, and as a raw material for a household transparent lapping agent.

The water-soluble cellulose ether is required to have a particle diameter distribution suitable for its application in various fields. Therefore, it is common that the water-soluble cellulose ether is produced by pulverization followed by sieving.

However, due to vibration or rocking motion during sieving on the sieve surface, the fibrous particles in the water-soluble cellulose ether generate cotton-like substances that are entangled with each other, or grow into an entangled layered state on the mesh of the sieve. Therefore, the pass-through efficiency during sieving may be deteriorated, or the yield may be lowered.

In order to solve this problem, there is provided a method of sieving a cellulose ether, comprising: (a) placing a cellulose ether (a starting material to be sieved) on a sieve surface; (b) vibrating and/or rocking the sieve surface to divide the material into a fine particle fraction (a material having desired sizes of particles or a sieve-passed material) and a circulating fraction (a material having large particles or a residue on the sieve surface), (c) taking out the fine particle fraction, and (d) applying air jet flush to the back surface of the sieve in the direction perpendicularly to the back surface to take out the circulation fraction (see JPH 08-041102A). This method uses a high performance sonic-type sieving machine with a vibrating sieve surface, or a tumble sieving machine with a rocking sieve surface (JPH 08-041102A).

SUMMARY OF THE INVENTION

In the method described in JPH 08-041102A, however, the sieving machine has a special and complicated structure, so that it is difficult to use for industrial applications.

The invention has been made in view of the above circumstances, and an object of the invention is to provide an efficient method for producing a water-soluble cellulose ether without using a special apparatus, as well as a novel water-soluble cellulose ether.

As a result of intensive studies to solve the above problems, the inventors have found that a sieve whose surface is coated with an inorganic metal compound can suppress entanglement of fibrous particles on the sieve surface and layered growth on the mesh of the sieve, thereby efficiently producing a water-soluble cellulose ether having many fibrous particles but having excellent flowability; and the invention has been completed.

In an aspect of the invention, there is provided a method for producing a sieved water-soluble cellulose ether, comprising:

a first pulverization step of pulverizing a water-soluble cellulose ether to obtain a first pulverization product, and a first sieving step of sieving the first pulverization product by using a first sieve whose mesh surface is coated with an inorganic metal compound to obtain a first-sieve-passed water-soluble cellulose ether.

In another aspect of the invention, there is provided an alkyl cellulose containing 800 or less of undissolved fibers having a size of 8 to 200 μm, as measured at 5° C. in 2 ml of a 0.1% by mass aqueous solution of the alkyl cellulose in a Coulter Counter method; and having, on a basis of dynamic image analysis to divide all particles into fine particles, spherical particles, and fibrous particles consisting of long and short fibrous particles, a volume fraction of the long fibrous particles relative to all of the particles of 40.0% or more;

wherein the fine particles have a length of fiber of less than 40 μm;

the spherical particles have a length of fiber of 40 μm or more and consist of first and second spherical particles, wherein the first spherical particles have an elongation, which is a ratio of a diameter of fiber to a length of fiber, of 0.5 or more, and the second spherical particles have an elongation of less than 0.5, an aspect ratio, which is a ratio of a minimal Feret diameter to a maximal Feret diameter, of 0.5 or more, and a circularity, which is a ratio of a perimeter ($P_{EQPC}$) of a circle that has the same area as a projection area to a perimeter ($P_{real}$) of a real particle, of 0.7 or more;

the long fibrous particles have a length of fiber of 200 μm or more and an elongation of less than 0.5, and consist of first and second long fibrous particles, wherein the first long fibrous particles have an aspect ratio of less than 0.5, and the second long fibrous particles have an aspect ratio of 0.5 or more and a circularity of less than 0.7; and the short fibrous particles have a length of fiber of 40 μm or more and less than 200 μm and an elongation of less than 0.5, and consist of first and second short fibrous particles, wherein the first short fibrous particles have an aspect ratio of less than 0.5, and the second short fibrous particles have an aspect ratio of 0.5 or more and a circularity of less than 0.7.

In a further aspect of the invention, there is provided a hydroxyalkyl alkyl cellulose containing 350 or less of undissolved fibers having a size of 8 to 200 μm, as measured at 25° C. in 2 ml of a 0.1% by mass aqueous solution of the hydroxyalkyl alkyl cellulose in a Coulter Counter method; and having, on a basis of dynamic image analysis to divide all particles into fine particles, spherical particles, and fibrous particles consisting of long and short fibrous particles, a volume fraction of the long fibrous particles relative to all of the particles of 30.0% or more;

wherein the fine particles have a length of fiber of less than 40 μm;

the spherical particles have a length of fiber of 40 μm or more and consist of first and second spherical particles, wherein the first spherical particles have an elongation, which is a ratio of a diameter of fiber to a length of fiber, of 0.5 or more, and the second spherical particles have an elongation of less than 0.5, an aspect ratio, which is a ratio of a minimal Feret diameter to a maximal Feret diameter, of 0.5 or more, and a circularity, which is a ratio of a perimeter ($P_{EQPC}$) of a circle that has the same area as a projection area to a perimeter ($P_{real}$) of a real particle, of 0.7 or more;

the long fibrous particles have a length of fiber of 200 μm or more and an elongation of less than 0.5, and consist of first and second long fibrous particles, wherein the first long fibrous particles have an aspect ratio of less than 0.5, and the second long fibrous particles have an aspect ratio of 0.5 or more and a circularity of less than 0.7; and the short fibrous particles have a length of fiber of 40 μm or more and less than 200 μm and an elongation of less than 0.5, and consist of first and second short fibrous particles, wherein the first short fibrous particles have an aspect ratio of less than 0.5, and the second short fibrous particles have an aspect ratio of 0.5 or more and a circularity of less than 0.7.

According to the invention, a water-soluble cellulose ether having good flowability can be produced efficiently at high yield without using a complicated apparatus. In addition, a water-soluble cellulose ether having the small number of undissolved fibers and excellent flowability in spite of the large number of fibrous particles can be produced.

BRIEF EXPLANATION OF DRAWING

FIG. 1 shows a flow chart for dividing "all particles" of hydroxyalkyl alkyl cellulose into four types of particles: "fine particles", "long fiber particles (LF1 and LF2)", "short fiber particles (SF1 and SF2) and "spherical particles (S1 and S2)".

DETAILED DESCRIPTION OF THE PREFERRED EMBODIMENTS

A water-soluble cellulose ether to be pulverized in the first pulverizing step in the method for producing a water-soluble cellulose ether will be described at first.

Examples of the water-soluble cellulose ether include an alkyl cellulose, a hydroxyalkyl cellulose, and a hydroxyalkyl alkyl cellulose.

Examples of the alkyl cellulose include methyl cellulose having a degree of substitution (DS) of methoxy groups of preferably 1.0 to 2.2, more preferably 1.4 to 2.2, and still more preferably 1.6 to 2.2; and ethylcellulose having a DS of ethoxy groups of preferably 1.0 to 3.0.

Examples of the hydroxyalkyl cellulose include hydroxyethyl cellulose having a molar substitution (MS) of hydroxyethoxy groups of preferably 1.0 to 3.0, and more preferably 1.5 to 3.0; and hydroxypropyl cellulose having an MS of hydroxypropoxy groups of preferably 1.0 to 5.0, and more preferably 2.0 to 5.0.

Examples of the hydroxyalkyl alkyl cellulose include hydroxyethyl methyl cellulose having a DS of methoxy groups of preferably 1.0 to 2.2, more preferably 1.4 to 2.2, and still more preferably 1.6 to 2.2, and an MS of hydroxyethoxy groups of preferably 0.1 to 1.5, and more preferably 0.2 to 1.5; hydroxypropyl methyl cellulose having a DS of methoxy groups of preferably 1.0 to 2.2, more preferably 1.4 to 2.2, and still more preferably 1.6 to 2.2, and an MS of hydroxypropoxy groups of preferably 1.6 to 2.2, more preferably 0.1 to 0.8, and still more preferably 0.12 to 0.8; and hydroxyethyl ethyl cellulose having a DS of ethoxy groups of preferably 1.0 to 2.5, and an MS of hydroxyethoxy groups of preferably 0.1 to 1.5.

The DS (degree of substitution) of the alkoxy groups in each of the alkyl cellulose, the hydroxyalkyl cellulose and the hydroxyalkyl alkyl cellulose means an average number of alkoxy groups per anhydroglucose unit. The MS (molar substitution) of the hydroxyalkoxy groups in each of the hydroxyalkyl cellulose and the hydroxyalkyl alkyl cellulose means an average number of moles of hydroxyalkoxy groups per mol of anhydroglucose unit.

The DS for an alkyl cellulose, the MS for a hydroxyalkyl cellulose and the DS and MS for a hydroxyalkyl alkyl cellulose may be obtained by converting the values obtained by the measurements in accordance with the analytical methods for methyl cellulose, hydroxypropyl cellulose, and hypromellose, respectively, in the Japanese Pharmacopoeia 17 th Edition.

The water-soluble cellulose ether may be produced by a known method such as a method for producing a water-soluble cellulose ether, comprising steps of: bringing a pulp into contact with an alkali metal hydroxide solution to obtain alkali cellulose, reacting the obtained alkali cellulose with an etherifying agent to obtain a crude product of water-soluble cellulose ether, washing the crude product, and drying.

The alkali cellulose may be obtained by bringing a pulp such as wood pulp or linter pulp into contact with an alkali metal hydroxide solution such as an aqueous solution of sodium hydroxide. The mass ratio of the alkali metal hydroxide solution to the pulp in the production of the alkali cellulose is adjusted depending on desired substitution degree(s) of the final water-soluble cellulose ether.

The etherification reaction between the obtained alkali cellulose and an etherifying agent results in a crude product of water-soluble cellulose ether. Examples of the etherifying agent include an alkyl halide such as methyl chloride; and an alkylene oxide such as ethylene oxide and propylene oxide.

The etherification reaction is carried out preferably in a pressure vessel with an internal stirrer, the inside temperature of which is adjustable, from the viewpoint of reaction controllability. The reaction temperature in the etherification is preferably from 50 to 110° C. from the viewpoint of reaction controllability and productivity. The reaction time for the etherification is preferably from 1.5 to 6.0 hours from the viewpoint of productivity.

Next, the crude product of water-soluble cellulose ether is washed. The water content of the washed water-soluble cellulose ether is preferably from 40 to 80% by mass from the viewpoint of flowability of the water-soluble cellulose ether.

The washed water-soluble cellulose ether is dried after an optional water is added and mixed; and subjected to optional pulverization to obtain a water-soluble cellulose ether. The water-soluble cellulose ether thus obtained is used as a starting material for the invention. The water content of the starting water-soluble cellulose ether is preferably from 0.1 to 10.0% by mass from the viewpoint of the pulverizability in the first pulverization step described later.

When the first sieving step described below is the first time of sieving, including the production steps of the starting water-soluble cellulose ether, the effects of the present invention become more remarkable. However, even when the above-mentioned optional pulverization is followed by the sieving step by using a usual sieve before the first pulverization step, that is, even when the first sieving step is not the first time of sieving, certain effects of the invention may be obtained.

The water content of the washed water-soluble cellulose ether and the water content of the starting water-soluble cellulose ether may be determined in accordance with "Loss on Drying Test" in the General Tests of the Japanese Pharmacopoeia 17th Edition. Each water content is a mass percentage of water to the total of the water and water-soluble cellulose ether.

A first pulverizing step of pulverizing the starting water-soluble cellulose ether to obtain a first pulverization product will be described at first.

The pulverization of the starting water-soluble cellulose ether is not particularly limited, and may be carried out, for example, by a pulverizer. Examples of the pulverizer include a impact mill, a vibration mill, a ball mill, a roller mill and a turbo mill.

The water content of the first pulverization product is preferably from 0.1 to 10.0% by mass from the viewpoint of efficiency in the sieving step. The water content of the first pulverization product may be measured in accordance with "Loss on Drying Test" in the Japanese Pharmacopoeia 17th Edition.

The average particle diameter of the first pulverization product is preferably 40 to 250 μm from the viewpoint of flowability of the first pulverization product. The average particle diameter of the first pulverization product may be measured in the same method as the method of measuring an average particle diameter of the water-soluble cellulose ether described later.

Next, a first sieving step of sieving the first pulverization product by using a sieve whose surface is coated with an inorganic metal compound, to obtain a first-sieve-passed water-soluble cellulose ether separated from a first-sieve-residual water-soluble cellulose ether, will be described.

Examples of the inorganic metal compound with which the sieve surface is coated include titanium compounds, zirconium compounds, hafnium compounds, nickel compounds, chromium compounds, tungsten compounds, aluminum compounds and molybdenum compounds. The titanium compounds and/or the zirconium compounds are preferable from the viewpoint of the low adhesiveness of sieve surface to the water-soluble cellulose ether.

Titanium dioxide is preferable as one of the titanium compounds, and zirconium dioxide is preferable as one of the zirconium compounds.

Regarding the coating of the sieve surface with the inorganic metal compound, coating of only the front surface of the sieve, on which the powder to be sieved is placed, can also bring a certain effect. However, coating of both of the front and back surfaces of the sieve is more preferable from the viewpoint of efficiency. A sieve whose surface is coated with an inorganic metal compound may be prepared, for example, by a method comprising a step of subjecting the sieve surface of a suitable sieve to S or Z processing of Nafitec® by NBC Meshtech Inc. The surface of the sieve to be processed is not particularly limited. It is preferably stainless steel plain-woven wire mesh from the viewpoint of strength, durability and sieving accuracy.

The thickness of the coating of the inorganic metal compound on the sieve surface is preferably from 50 to 1000 nm, more preferably from 50 to 450 nm, and still more preferably from 100 to 400 nm. The thickness of the coating may be measured as follows. The wire mesh of the sieve is trimmed to about 10 mm square using metal cutting scissors; the trimmed wire mesh is placed at the center of the bottom of a cylindrical container having a bottom diameter of 2 cm and a height of 20 mm; and an epoxy resin (EpoCure 2 produced by Buehler Ltd.) is poured into the container up to the height of about 3 mm for embedding treatment. Thereafter, the embedded wire mesh is polished with sandpaper to prepare a plate-like measurement sample of 10 mm×10 mm×(thickness of 1 mm). The measurement sample is fixed to the sample base of IM 4000 manufactured by Hitachi High-Technologies, Ltd. by using hot wax, and then the side surface (10 mm×thickness 1 mm, one of surfaces) of the measurement sample is subjected to cross-sectional processing by the argon ion milling at an accelerating voltage of 5 kV for 3 hours. In the argon ion milling, accessories of IM-4000 manufactured by Hitachi High-Technologies Ltd. may be used as masks.

After the cross-sectional processing by the argon ion milling, the platinum palladium sputter coating is applied to the processed surface until it reaches about 2 nm thickness. Then, a cross-sectional view image magnified 10,000 times is obtained by using a Field Emission Scanning Electron Microscope JSM-7900F (produced by JEOL Ltd.) equipped with the accompanied backscattered-electron detector under the following conditions: an illumination current of 20 pA, an acceleration voltage of 5 kV, and a focal length of 4 nm. The thickness of the coating may be visually obtained from the obtained image.

The effective sieving area in a sieve whose surface is coated with an inorganic metal compound is preferably from 0.0001 to 1,000 $m^2$ from the viewpoint of industrial availability.

In the sieve whose surface is coated with the inorganic metal compound, each opening of the sieve surface may be appropriately selected depending on the application. It is preferably 0.045 to 0.697 mm, more preferably 0.111 to 0.525 mm from the viewpoint of the processing speed or the flowability of the sieve-passed water-soluble cellulose ether.

In the sieve whose sieve surface is coated with the inorganic metal compound, a wire diameter of the wire mesh may be appropriately selected depending on the application. It is preferably from 0.001 to 5.0 mm from the viewpoint of strength.

Examples of the sieving machine in the first sieving step include a vibration type sieving machine, an in-plane motion type sieving machine, a Ro-Tap type sieving machine, a movable mesh type sieving machine, a forced stirring type sieving machine, and an ultrasonic sieving machine.

Examples of the vibration type sieving machine include a ripple-flow type K-R screen machine (produced by KOBUKURO TECHNO Co., Ltd.), a low-head type K-R screen machine (produced by KOBUKURO TECHNO Co. Ltd.), an electromangetic screen machine (produced by SINFONIA TECHNOLOGY Co., Ltd.), an RV screen machine (produced by SINFONIA TECHNOLOGY Co., Ltd.), a balanced screen machine (produced by SINFONIA TECHNOLOGY Co., Ltd.), a BM screen machine (produced by SINFONIA TECHNOLOGY Co., Ltd.), a wave screen machine (produced by SINFONIA TECHNOLOGY Co., Ltd.), a linear drive screen machine (produced by SINFONIA TECHNOLOGY Co., Ltd.), a Gyro screen machine (produced by SINFONIA TECHNOLOGY Co., Ltd.), rubber spring screen machine (produced by SINFONIA TECHNOLOGY Co., Ltd.), a Grizzly feeder (produced by SINFONIA TECHNOLOGY Co., Ltd.), and a circular vibration sieving machine (produced by SINFONIA TECHNOLOGY Co., Ltd.).

Examples of the in-plane motion sieving machine include an aluminum square sifter (produced by Meiji Machine Co., Ltd.), a plan sifter (produced by Meiji Machine Co., Ltd.), a gyratory sifter (produced by Meiji Machine Co., Ltd.), a gyro sifter (produced by TOKUJU Corporation), a ROTEX screener (produced by ROTEX Co., Ltd.), and an Allgaier shifter (manufactured by Allgaier Co., Ltd.).

Examples of the Ro-Tap type sieving machine include a Ro-Tap type sieving shaker (produced by TAKEDA Corporation and Kansai Wire Netting Co., Ltd.), and a BS sieve shaker (produced by SEISHIN ENTERPRISE Co., Ltd.).

Examples of the movable mesh type sieving machine includes a jumping screen (produced by LIRAS TECHNO Co., Ltd.).

Examples of the forced stirring type sieving machine include a UX sifter (produced by TOKUJU CORPORATION).

Examples of the ultrasonic sieving machine include a sweep sieve machine (produced by UC Japan Corporation).

When each sieve contains a sieve surface coated with the inorganic metal compound, each sieve is placed preferably in 1 to 20 stages in the pass-through direction in the sieving machine, from the viewpoint of productivity.

The sieving conditions in the first sieving step may be appropriately selected in consideration of a type of the sieving machine and the target particle diameter distribution of the water-soluble cellulose ether. The frequency of the vibration type sieving machine is preferably from 600 to 100,000 rpm from the viewpoint of efficient sieving. The amplitude in the vibration type sieving machine is preferably from 0 to 100 mm from the viewpoint of efficient sieving.

The weight phase angle in a circular vibration type sieving machine, which is one of the vibration type sieving machine, is preferably 15 to 90 degrees, more preferably 35 to 90 degrees, from the viewpoint of efficient sieving.

The frequency in the in-plane sieving type machine is preferably from 10 to 500 rpm from the viewpoint of efficient sieving. The amplitude in the in-plane sieving type machine is preferably from 5 to 100 mm in terms of half amplitude from the viewpoint of efficient sieving.

The shaking number in the Ro-Tap sieving type machine is preferably from 200 to 350 rpm from the viewpoint of efficient sieving. The shaking width in the Ro-Tap type sieving machine is preferably from 10 to 100 mm from the viewpoint of efficient sieving. The number of tapping in the Ro-Tap type sieving machine is preferably from 10 to 500 tapping per minute from the viewpoint of efficient sieving.

The sieving time in the first sieving step, i.e. the period of time from the start to the end of the sieving of the first pulverization product, is preferably from 0.1 to 12 hours from the viewpoint of productivity.

The average particle diameter of the first-sieve-passed water-soluble cellulose ether, which has passed through the first sieve, is preferably from 30 to 200 μm from the viewpoint of flowability of the first-sieve-passed water-soluble cellulose ether. The average particle diameter of the first-sieve-residual water-soluble cellulose ether, which is a residue on the first sieve, is preferably from 100 to 600 μm from the viewpoint of efficiency during the pulverization. The average particle diameter of the first-sieve-passed water-soluble cellulose ether and the first-sieve-residual water-soluble cellulose ether may be measured in the same method as the method for measuring the average particle diameter of the water-soluble cellulose ether described later.

The absolute value of the difference between the average particle diameters of the first-sieve-passed water-soluble cellulose ether and the first-sieve-residual water-soluble cellulose ether is preferably 65 μm or more, more preferably 65 to 150 μm.

By using a sieve whose surface is coated with an inorganic metal compound, entanglement of fibrous particles on the sieve surface and layered growth on the mesh of the sieve can be suppressed, but there is concern about the flowability of the sieve-passed water-soluble cellulose ether because of the presence of the fibrous particles which has passed through the sieve. However, contrary to the concern, it has been found that the sieve-passed water-soluble cellulose ether having good flowability can be efficiently produced.

As described above, the water-soluble cellulose ether is obtained as the faction which has passed through the first sieve. The water-soluble cellulose ether obtained as the first-sieve-passed fraction may be preferably combined with the water-soluble cellulose ether obtained as the second-sieve-passed fraction. The second-sieve-passed fraction is obtained by further pulverizing the residue on the first sieve to obtain the second pulverization product and subjecting the second pulverization product to the second sieving.

The second pulverization step of pulverizing the first-sieve-residual water-soluble cellulose ether to obtain a second pulverization product will be described.

The pulverization of the first-sieve-residual water-soluble cellulose ether may be carried out in the same manner as in the first pulverization step. Examples of the pulverizer may include those of pulverizer in the first pulverization step. The pulverizer in the second pulverization step may be the same as or different from the pulverizer in the first pulverization step.

The water content of the second pulverization product is preferably from 0.1 to 10.0% by mass from the viewpoint of efficiency in the sieving step. The water content of the second pulverization product may be measured in accordance to "Loss on Drying Test" of the Japanese Pharmacopoeia 17th Edition.

The average particle diameter of the second pulverization product is preferably from 40 to 250 μm from the viewpoint of efficiency during pulverization. The average particle diameter of the second pulverization product may be measured in the same method as the method for measuring the average particle diameter of the water-soluble cellulose ether described later.

Next, the second sieving step for sieving the second pulverization product to obtain a second-sieve-residual water-soluble cellulose ether and a second-sieve-passed water-soluble cellulose ether will be described.

In the second sieving step, a sieve whose surface is coated or not coated with an inorganic metal compound may be used. The sieve whose surface is coated with an inorganic metal compound is preferable from the viewpoint of the processing speed.

Examples of the sieve whose sieve is not coated with an inorganic metal compound include a sieve containing stainless steel plain-woven wire mesh (produced by Kansai Wire Netting Co., ltd.), a sieve containing stainless steel twilled wire mesh (produced by Kansai Wire Netting Co., ltd.), a sieve containing stainless steel pre-crimped wire screen (produced by Kansai Wire Netting Co., ltd.), a sieve containing stainless steel flat-top wire screen (produced by Kansai Wire Netting Co., ltd.), a sieve containing stainless steel Ton-Cap screen (produced by Kansai Wire Netting Co., ltd.), a sieve containing stainless steel Ty-Rod screen as its sieve surface (produced by Kansai Wire Netting Co., ltd.), a sieve containing stainless steel wedge wire screen (produced by Kansai Wire Netting Co., ltd.), a sieve containing stainless steel perforated screen with circular holes (produced by Kansai Wire Netting Co., ltd.), a sieve containing stainless steel perforated screen with square holes (produced by Kansai Wire Netting Co., ltd.), a sieve containing a Nylon 66PA sieve surface (produced by Tokyo Screen Co., Ltd.), a sieve containing a polyester sieve surface (produced by Tokyo Screen Co., Ltd.), a sieve containing a polyethylene sieve surface (produced by Tokyo Screen Co. Ltd.), and a sieve containing a polypropylene sieve surface (produced by Tokyo Screen Co., Ltd.).

The effective sieving area of the sieve in the second sieving step is preferably from 0.0001 to 1,000 m² from the viewpoint of industrial availability.

The sieve opening in the second sieving step may be appropriately selected as needed. It is preferably from 0.045 to 0.697 mm, and more preferably from 0.111 to 0.525 mm from the viewpoint of the processing speed or the flowability of the sieve-passed water-soluble cellulose ether.

The wire diameter of the sieve in the second sieving step may be appropriately selected as needed. It is preferably from 0.001 to 5.0 mm from the viewpoint of sieving net strength.

Examples of the sieving machine to be used in the second sieving step may include those of the sieving machine to be used in the first sieving step.

The number of sieves installed in the sieving machine, sieving conditions, and sieving time in the second sieving step are the same as those in the first sieving step.

Use of a sieve whose surface is coated with an inorganic metal compound can suppress the entanglement of fibrous particles on the sieve surface and the layered growth on the mesh of the sieve, so that an amount of water-soluble cellulose ether having the target average particle diameter in the water-soluble cellulose ether remaining on the first sieve is reduced, so that the number of undissolved fibers caused by excessive pulverization of the water-soluble cellulose ether having the target average particle diameter can be reduced.

The average particle diameter of the second-sieve-passed water-soluble cellulose ether, which has passed through the second sieve, varies depending on the mesh opening used in the second sieving step. It is preferably from 30 to 200 μm from the viewpoint of the flowability of the second-sieve-passed water-soluble cellulose ether. The average particle diameter of the second-sieve-residual water-soluble cellulose ether, which is a residue on the second sieve, varies depending on the mesh opening used in the second sieving step. It is preferably from 100 to 600 μm from the viewpoint of efficiency in pulverization. The average particle diameter of the second-sieve-passed water-soluble cellulose ether and the average particle diameter of the second-sieve-residual water-soluble cellulose ether may be measured in the same method as the method for measuring the average particle diameter of the water-soluble cellulose ether described later.

The absolute value of the difference between the average particle diameters of the second-sieve-passed water-soluble cellulose ether and the second-sieve-residual water-soluble cellulose ether is preferably 75 μm or more, more preferably from 75 to 130 μm.

The first-sieve-passed water-soluble cellulose ether and the second-sieve-passed water-soluble cellulose ether may be used separately for a desired application, or may be mixed and used. The mixing of the first-sieve-passed and second-sieve-passed water-soluble cellulose ethers is not particularly limited as long as they can be sufficiently mixed. For example, a mixer can be used. Examples of the mixer include a rotary type mixer, a mechanical stirring type mixer, a flow stirring type mixers, a non-stirring type mixer, and a high-speed and high-shear impact type mixer.

A viscosity, an average particle diameter, a loosened bulk density, a tapped bulk density, and a degree of compression of the water-soluble cellulose ether obtained as the first-sieve-passed fraction, the second-sieve-passed fraction, or the mixture of the first-sieve-passed and second-sieve-passed fractions will be described. The values of DS and MS of the obtained water-soluble cellulose ether are the same as those of DS and MS of the raw material water-soluble cellulose ether to be used in the first pulverization step.

The viscosity at 20° C. of a 2% by mass aqueous solution of the water-soluble cellulose ether is preferably from 3 to 500,000 mPa·s, more preferably from 3 to 200,000 mPa·s, from the viewpoint of viscosity or solubility suitable for the application.

Wen the viscosity at 20° C. of a 2% by mass aqueous solution of the water-soluble cellulose ether is 600 mPa·s or more, it may be measured by using a single cylinder-type rotational viscometer in accordance with "Viscosity measurement by rotational viscometer" in General Tests of the Japanese Pharmacopoeia 17th Edition. When the viscosity at 20° C. of a 2% by mass aqueous solution of the water-soluble cellulose ether is less than 600 mPa·s, it may be measured by using a Ubbelohde-type viscometer in accordance with "Viscosity measurement by the capillary tube viscometer" in General Tests of Japanese Pharmacopoeia 17th Edition.

The average particle diameter of the water-soluble cellulose ether is preferably from 30 to 300 μm, more preferably from 40 to 200 μm, and still more preferably from 50 to 150 μm from the viewpoint of flowability or dissolution rate.

The average particle diameter of the water-soluble cellulose ether may be determined by calculating the diameter corresponding to the 50% cumulative value of the volume-based cumulative distribution curve, by using a Mastersizer 3000 (produced by Malvern), which is a particle diameter distribution measurement apparatus based on a laser diffraction method. The dry method is used for the measurement under the conditions of a dispersing pressure of 2 bar and a scattering strength of 2 to 10% in accordance with the Fraunhofer diffraction theory.

The loose bulk density of the water-soluble cellulose ether is preferably from 0.15 to 0.60 g/ml, and more preferably from 0.18 to 0.60 g/ml from the viewpoint of the flowability of the water-soluble cellulose ether.

The term "Loose bulk density" means the bulk density in a loosely filled state. It may be measured with a POWDER TESTER PT-S (produced by HOSOKAWA MICRON) by the method comprising steps of: feeding a sample into a stainless steel 100 ml cylinder container (diameter: 5.05 cm, and height: 5.05 cm) uniformly from the 23 cm above the cylinder through a sieve (opening: 1 mm), leveling the sample by cutting at the top face of the cylindrical container, and weighing the container filled with the sample.

The tapped bulk density of the water-soluble cellulose ether is preferably from 0.20 to 1.20 g/ml, more preferably from 0.25 to 1.0 g/ml from the viewpoint of the flowability of the water-soluble cellulose ether.

The "tapped bulk density" is a bulk density in the state where a sample is tightly packed into the cylindrical container by tapping. The tapping is an operation in which a container filled with a sample is repeatedly dropped from a predetermined height to apply a light impact to the bottom, thereby closely filling the sample. As a matter of fact, after measuring the "loose bulk density" by leveling a sample by cutting at the top surface of the cylindrical container and weighing the container filled with the sample, the container is capped. The powder sample is added into the upper edge of the capped container so as to fill the space inside of the cap. Then, the tapping of the capped container is carried out by dropping it from the height of 1.8 cm and is repeated 180 times. After completion of the tapping, the cap is removed and the sample is leveled by cutting at the top face of the container. Then, the container filled with the sample is weighed. The bulk density in the tightly packed state generated in such a manner is referred to as the tapped bulk density.

The degree of compression of the water-soluble cellulose ether is preferably from 1.0 to 50.0%, more preferably from 1.0 to 40.0%, from the viewpoint of the flowability of the water-soluble cellulose ether.

The "degree of compression" is a value indicating the degree of bulk reduction, and is calculated by the following equation.

Degree of compression (%)={(tapped bulk density−loose bulk density)/tapped bulk density}×100

Next, the shape and the volume fraction of the water-soluble cellulose ether particles obtained as the first-sieve-passed fraction, the second-sieve-passed fraction, or the mixture of the first-sieve-passed and second-sieve-passed fractions will be described.

In this specification, a water-soluble cellulose ether is divided into four types of particles: "long fibrous particles", "short fibrous particles", "spherical particles", and "fine particles". FIG. 1 shows a flowchart summarizing the method for dividing "all particles" of water-soluble cellulose ether into four types of particles: "fine particles", "long fibrous particles (LF1 and LF2)", "short fibrous particles (SF1 and SF2)", and "spherical particles (S1 and S2)".

Each volume fraction of the respective types of particles of a water-soluble cellulose ether may be determined by measuring shape parameters including a length of fiber (LEFI), a diameter of fiber (DIFI), an elongation, an aspect ratio, and a circularity, by the dynamic-image analysis. The dynamic image analysis is a method in which images of particles dispersed in a fluid such as a gas or a solvent are continuously photographed and are binarized and analyzed to obtain a particle diameter or a particle shape. The analysis may be performed by using, for example, a dynamic-image analysis type particle diameter distribution analyzer, QICPIC/R16 (manufactured by Sympatec GmbH).

All particles A are divided into particles C having a length of fiber (LEFI) of 40 μm or more and fine particles B having a length of fiber of less than 40 μm. The LEFI is defined as the length of the longest direct path that connects the ends of the particle within the contour of the particle. A QICPIC/R16 equipped with an M7 lenses has a detection limit of 4.7 μm and thus fails to detect a particle having an LEFI of less than 4.7 μm. However, the volume of particles having an LEFI of less than 4.7 μm is extremely small relative to that of all particles of the water-soluble cellulose ether, so that it is negligible for the purposes of the invention.

The particles C having an LEFI of 40 μm or more are divided into first spherical particles (S1) having an elongation of 0.5 or more and particles D having an elongation of less than 0.5, wherein the elongation is a ratio (DIFI/LEFI) of a diameter of fiber: (DIFI) to LEFI of the particle. The DIFI is defined as the minor diameter of a particle, and is calculated by dividing the projection area of the particle by the sum of all lengths of the fiber branches of the particle.

The particles D having an LEFI of 40 μm or more and an elongation of less than 0.5 are divided into particles E having an aspect ratio of less than 0.5 and particles F having an aspect ratio of 0.5 or more, wherein the aspect ratio is a ratio (Fmin/Fmax) of minimal Feret diameter (Fmin) to maximal Feret diameter (Fmax). Each particle has an aspect ratio of more than 0 and not more than 1. The Feret diameter is the distance between two parallel tangent lines that put the particle therebetween. The maximal Feret diameter (Fmax) is the largest distance between pairs of tangent lines to the particle in consideration of all possible orientations by changing the directions from 0° to 180°, and the minimal Feret diameter (Fmin) is a minimal distance between pairs of tangent lines to the particle in consideration of all possible orientations by changing the direction from 0° to 180°.

The fibrous particles E having an LEFI of 40 μm or more, and an elongation of less than 0.5, and an aspect ratio of less than 0.5 are divided into first long fibrous particles (LF1) having an LEFI of 200 μm or more and first short fibrous particles (SF1) having an LEFI of less than 200 μm.

The particles F having an LEFI of 40 μm or more, an elongation of less than 0.5, and an aspect ratio of 0.5 or more are divided into second spherical particles (S2) having a circularity of 0.7 or more and fibrous particles G having a circularity of less than 0.7. The circularity is a ratio of the perimeter ($P_{EQPC}$) of a circle that has the same area as the projection area ($A_p$) of the particle to the perimeter ($P_{real}$) of the real particle, and is defined by the following equation. Each particle has a circularity of more than 0 and not more than 1. A particle having a smaller circularity has a more irregular shape. The EQPC is the diameter of a circle of an equal projection area, and is defined as the diameter of a circle that has the same area as the projection area of the particle, and is also called Heywood diameter.

$$\text{Circulariy} = P_{EQPC}/P_{real} = 2\sqrt{\pi \cdot A_p}/P_{real},$$

The fibrous particles G having an LEFI of 40 μm or more, an elongation of less than 0.5, an aspect ratio of 0.5 or more, and a circularity of less than 0.7 are divided into second long fibrous particles (LF2) having a LEFI of 200 μm or more and second short fibrous particles (SF2) having an LEFI of less than 200 μm.

The volume ($V_m$) of the fine particles in a water-soluble cellulose ether may be calculated by the following equation where each fine particle is assumed to be a sphere having a diameter of EQPC.

$$V_m = (\pi/6) \times (EQPC)^3 \times N_m,$$

wherein $N_m$ is the number of fine particles in a sample, and EQPC is a median EQPC corresponding to the 50% cumulative value on a number-based cumulative particle diameter distribution curve of fine particles.

In the specification, particles having an LEFI of 40 μm or more, which are particles other than the fine particles having an LEFI of less than 40 μm among the all particles, are divided, on basis of such above shape parameters of particles as LEFI, an elongation, an aspect ratio, and a circularity, into "long fibrous particles", "short fibrous particles", and "spherical particles", which are the distinguished from each other.

<Long Fibrous Particles>

Particles satisfying the following definition of LF1 or LF2 are combined into "long fibrous particles".

LF1: particles having an elongation of less than 0.5, an aspect ratio of less than 0.5, and an LEFI (length of fiber) of 200 μm or more, and LF2: particles having an elongation of less than 0.5, an aspect ratio of 0.5 or more, a circularity of less than 0.7, and an LEFI (length of fiber) of 200 μm or more.

The volume ($V_{LF}$) of the long fibrous particles in a water-soluble cellulose ether may be calculated by the following equation wherein each long fibrous particle is assumed to be a cylindrical column having a bottom diameter of DIFI and a height of LEFI.

$$V_{LF}=(\pi/4)\times(DIFI)^2\times(LEFI)\times N_{LF},$$

wherein $N_{LF}$ is the number of long fibrous particles in the sample, DIFI is a median DIFI corresponding to the 50% cumulative value on a number-based cumulative diameter distribution curve of long fibrous particles, and LEFI is a median LEFI corresponding to the 50% cumulative value on a number-based cumulative particle diameter distribution curve of long fibrous particles.

The volume of particles satisfying the definition of LF1 and the volume particles satisfying the definition of LF2 are calculated in accordance with the above equation, respectively, and a sum of the volumes means the volume of the long fibrous particles of a water-soluble cellulose ether.

<Short Fibrous Particles>

Particles satisfying the following definition of SF1 or SF2 are combined into "short fibrous particles".

SF1: particles having an elongation of less than 0.5, an aspect ratio of less than 0.5, and a LEFI (length of fiber) of 40 μm or more and less than 200 μm, and SF2: particles having an elongation of less than 0.5, an aspect ratio of 0.5 or more, a circularity of less than 0.7, and a LEFI (length of fiber) of 40 μm or more and less than 200 μm.

The volume ($V_{SF}$) of the short fibrous particles of a water-soluble cellulose ether may be calculated by the following equation where each short fibrous particle is assumed to be a cylindrical column having a bottom diameter of DIFI and a height of LEFI, in the same manner as for the above long fibrous particles.

$$V_{SF}=(\pi/4)\times(DIFI)^2\times(LEFI)\times N_{SF}$$

wherein $N_{SF}$ is the number of short fibrous particles in the sample, DIFI is a median DIFI corresponding to the 50% cumulative value on a number-based cumulative particle diameter distribution curve of the short fibrous particles, and LEFI is a median LEFI corresponding to the 50% cumulative value on a number-based cumulative particle diameter distribution curve of short fibrous particles.

The volume of particles satisfying the definition of SF1 and the volume of particles satisfying the definition of SF2 are calculated in accordance with the above equation, respectively, and a sum of the volumes means the volume of the short fibrous particles of a water-soluble cellulose ether.

<Spherical Particles>

Particles satisfying the definition S1 or S2 is combined into "spherical particles".

S1: particles having an elongation of 0.5 or more and an LEFI (length of fiber) of 40 μm or more, and S2: particles having an elongation of less than 0.5, an aspect ratio of 0.5 or more, a circularity of 0.7 or more, and an LEFI (length of fiber) of 40 μm or more.

The volume ($V_S$) of the spherical particles of a water-soluble cellulose ether may be calculated by the following equation, where each spherical particle is assumed to be a sphere having a diameter of EQPC.

$$V_S=(\pi/6)\times(EQPC)^3\times N_S,$$

wherein $N_S$ is the number of spherical particles in the sample, and EQPC is a median EQPC corresponding to the 50% cumulative value on a number-based cumulative particle diameter distribution curve of the spherical particles.

The volume of particles satisfying the definition S1 and the volume of particles satisfying the definition S2 are calculated in accordance with the above equation, respectively, and a sum of the volumes means the volume of the spherical particles of a water-soluble cellulose ether.

The volume fraction of each type of particles of a water-soluble cellulose ether may be calculated from the following corresponding equation on basis of the above-defined volumes, $V_m$, $V_{LF}$, $V_{SF}$ and $V_S$.

Volume fraction of fine particles=$\{V_m/(V_m+V_{LF}+V_{SF}+V_S)\}\times100$

Volume fraction of long fibrous particles=$\{V_{LF}/(V_m+V_{LF}+V_{SF}+V_S)\}\times100$ Volume fraction of short fibrous particles=$\{V_{SF}/(V_m+V_{LF}+V_{SF}+V_S)\}\times100$ Volume fraction of spherical particles=$\{V_S/(V_m+V_{LF}+V_{SF}+V_S)\}\times100$ The volume fraction of each type of particles, which are long fibrous particles, short fibrous particles, spherical particles and fine particles, is determined as follows. A dynamic image analysis type particle diameter distribution analyzer QICPIC/R16 (manufactured by Sympatec GmbH) equipped with a quantitative feeder VIBRI/L, an air flow type disperser RODOS/L and a M7 lens is used under the conditions of a frame rate of 500 Hz, an injector of 4 mm, a dispersion pressure of 1 bar. The graphics of the imaged particles are analyzed by analysis software WINDOX5 Version: 5.9.1.1 to determine the number-based median EQPC, the number-based median LEFI, the number-based median DIFI, the elongation, the aspect ratio and the circularity with respect to each type of particles. The volume fraction of each type of particles is calculated by the above equation based on the measured values. It is noted that M 7 is used as the division of analysis.

When the water-soluble cellulose ether is an alkyl cellulose, the volume fraction of the fibrous particles in all particles is preferably 40.0% or more, and the number of undissolved fibers having a size of 8 to 200 μm, as measured at 5° C. in 2 ml of a 0.1% by mass aqueous solution of the alkyl cellulose in a Coulter Counter method, is preferably 800 or less, more preferably 20 to 600, from the viewpoint of product quality.

When the water-soluble cellulose ether is a hydroxyalkyl alkyl cellulose, the volume fraction of the fibrous particles in all particles is preferably 30.0% or more, and the number of undissolved fibers having a size of 8 to 200 μm, as measured at 25° C. in 2 ml of a 0.1% by mass aqueous solution of the hydroxyalkyl alkyl cellulose in a Coulter Counter method, is preferably 350 or less, more preferably 20 to 150, from the viewpoint of product quality.

The number of undissolved fibers may be measured in a Coulter Counter method. More specifically, an alkyl cellulose or a hydroxyalkyl alkyl cellulose as the water-soluble cellulose ether is dissolved at 5° C. or 25° C. in an aqueous electrolyte solution ISOTON II (produced by Beckman Coulter) for the Coulter counter method in a constant temperature bath so as to form a 0.1% by mass aqueous solution. Then, the number of undissolved fibers having sizes of 8 to 200 μm in 2 ml of the aqueous solution is measured by using an aperture tube having a diameter of 400 μm and a Coulter counter TA II manufactured by the Coulter.

The volume fraction of the long fibrous particles of the alkyl cellulose is preferably from 40.0 to 55.0% by mass, more preferably from 40.0 to 50.0% by mass, from the viewpoint of the flowability of the alkyl cellulose ether and removal of the undissolved fibers.

The volume fraction of the short fibrous particles of the alkyl cellulose is preferably 15.0 to 30.0% by mass, more preferably 15.0 to 25.0% by mass, from the viewpoint of the efficiency of pulverization.

The volume fraction of the spherical particles of the alkyl cellulose is preferably from 5.0 to 44.9% by mass, more preferably from 35.0 to 43.0% by mass, from the viewpoint of the flowability of the alkyl cellulose.

The volume fraction of the fine particles of the alkyl cellulose is preferably 0.1 to 10.0% by mass, more preferably 0.1 to 5.0% by mass, from the viewpoint of the efficiency of pulverization.

The volume fraction of the long fibrous particles of the hydroxyalkyl alkyl cellulose is preferably 30.0 to 55.0% by mass, more preferably 30.0 to 50.0% by mass, from the viewpoint of the flowability of the hydroxyalkyl alkyl cellulose and the removal of undissolved fibers.

The volume fraction of the short fibrous particles of the hydroxyalkyl alkyl cellulose is preferably from 10.0 to 30.0% by mass, more preferably from 10.0 to 25.0% by mass, from the viewpoint of the efficiency of pulverization.

The volume fraction of the spherical particles of the hydroxyalkyl alkyl cellulose is preferably from 10.0 to 59.9% by mass, more preferably from 30.0 to 55.0% by mass, from the viewpoint of the flowability of the hydroxyalkyl alkyl cellulose.

The volume fraction of the fine particles of the hydroxyalkyl alkyl cellulose is preferably from 0.1 to 5.0% by mass, more preferably from 0.1 to 2.0% by mass, from the viewpoint of the efficiency of pulverization.

The high volume fraction of long fibrous particles of the water-soluble cellulose ether results in the increased percentage of undissolved fibers having long length of fibers in the water-soluble cellulose ether. In the aqueous solution of the water-soluble cellulose ether, the undissolved fibers having long length of fibers can be easily removed by filtration, centrifugal sedimentation or the like, in comparison with the undissolved fibers having short length of fibers. Consequently, the aqueous solution of the water-soluble cellulose ether can be prepared in the presence of the reduced number of undissolved fibers, so that an improvement in quality is expected.

EXAMPLES

The invention will be described in detail with reference to Examples and Comparative Examples. However, it should not be construed that the invention is limited to or by Examples.

The sieve having both mesh surfaces coated with an inorganic-metal compound was prepared by subjecting both of the front and back surfaces of stainless-steel plain-woven wire mesh (manufactured by Kansai Wire Netting Co., Ltd.) to Nafitec processing by NBC Meshtec Inc.

In Example 1, the sieve was prepared by subjecting the sieve having both mesh surfaces coated with the inorganic metal compound to S processing. The thickness of the coating of the inorganic metal compound on the wire mesh differed depending on the location of the coating surface, and was 100 to 300 nm per line, where vertical and horizontal lines constituted the mesh surface.

In each of Examples 2 to 4, the sieve was prepared by subjecting the sieve having both mesh surfaces coated with the inorganic metal compound to Z processing. The thickness of the coating of the inorganic metal compound on the wire mesh differed depending on the location of the coating surface, and was 200 to 400 nm per line, where vertical line and horizontal lines constituted the mesh surface.

The processing speed was calculated by the following equation.

Processing speed $(kg/hr/m^2)$=first or second-sieve-passed mass (kg)/{sieving time (hr)×effective sieving area $(m^2)$}

Example 1

Alkaline cellulose produced by bringing 1.00 parts by mass of wood pulp into contact with 2.10 parts by mass of a 49% by mass sodium hydroxide aqueous solution was reacted with 1.69 parts by mass of methyl chloride and 0.26 parts by mass of propylene oxide at a temperature of 60 to 90° C. for 2 hours in a pressure vessel with an internal stirrer, while stirring, to obtain a crude product of hydroxypropyl methyl cellulose (HPMC). Then, the crude product of hydroxypropyl methyl cellulose was washed. Water is added thereto and mixed to obtain the washed hydroxypropyl methyl cellulose having the water content adjusted to 65% by mass, and then dried to obtain 0.15 kg of starting hydroxypropyl methyl cellulose having a water content of 1.5% by mass.

The obtained starting hydroxypropyl methyl cellulose (0.15 kg) was pulverized by a batch type vibration mill (manufactured by Chuo Kakohki Co., Ltd.) to obtain 0.15 kg of a first pulverization product having a water content of 2.1% by mass and an average particle diameter of 122.0 μm.

Then, the obtained first pulverization product (0.15 kg) was supplied to a Ro-Tap type sieve shaker (manufactured by Takeda Rika Kogyo Co., Ltd.) in which a sieve having a sieve surface coated with zirconium dioxide and titanium dioxide and having an effective sieve area of 0.025 $m^2$, opening of 0.213 mm and a wire diameter of 0.15 mm was installed at one stage. It was sieved under the conditions (number of shaking: 250 rpm, number of tapping; 67 times/min, shaking width: 50 mm, and sieving time: 0.3 hours) into 0.136 kg of first-sieve-passed hydroxypropyl methyl cellulose having an average particle diameter of 110.0 μm and 0.014 kg of first-sieve-residual hydroxypropyl methyl cellulose having an average particle diameter of 240.5 μm were obtained. The treatment rate in the first sieving step was 18.1 $kg/hr/m^2$, and the yield of hydroxypropyl methyl cellulose was 90.7%. Pulverization conditions and results are as shown in Table 1.

Regarding the resulting hydroxypropyl methyl cellulose, a DS of the methoxy groups and an MS of the hydroxypropoxy groups, a viscosity at 20° C. of the 2% by mass aqueous solution thereof, a loose bulk density, a tapped bulk density, a degree of compression, a volume fraction of long fibrous particles, a volume fraction of short fibrous particles, a volume fraction of spherical particles, a volume fraction of fine particles, the number of undissolved fibers having sizes of 8 to 200 μm as measured at 25° C. in 2 ml of a 0.1% by mass aqueous solution of the hydroxypropyl methyl cellulose by using an aperture tube with a diameter of 400 μm are shown in Table 2.

Example 2

Alkaline cellulose produced by bringing 1.00 parts by mass of wood pulp into contact with a weight ratio of 2.53 parts by mass of a 49% by mass sodium hydroxide aqueous solution was reacted with 2.03 parts by mass of methyl chloride and 0.52 parts by mass of propylene oxide at a temperature of 60 to 90° C. for 2 hours in a pressure vessel with an internal stirrer, while stirring, to obtain a crude product of hydroxypropyl methyl cellulose. Thereafter, the crude product of hydroxypropyl methyl cellulose was washed. Water was added thereto and mixed to obtain the washed hydroxypropyl methyl cellulose having a water content of 50% by mass, and then dried to obtain 25.0 kg of starting hydroxypropyl methyl cellulose having a water content of 1.4% by mass.

The obtained starting hydroxypropyl methylcellulose (25.0 kg) was pulverized by a batch type vibration mill (manufactured by Chuo Kakohki Co., Ltd.) to obtain 25.0 kg of a first pulverization product having a water content of 2.0% by mass and an average particle diameter of 115.0 μm.

Then, the obtained first pulverization product (25.0 kg) was supplied to a circular vibration type sieving machine (produced by DALTON Corporation) in which a sieve having a sieve surface coated with zirconium dioxide and having an effective sieve area of 0.33 m$^2$, opening of 0.178 mm and a wire diameter of 0.14 mm was installed at one stage. It was sieved under the conditions (frequency of 1500 rpm, weight phase angle: 50°, and sieving time: 2 hour) into 22.5 kg of first-sieve-passed hydroxypropyl methyl cellulose having an average particle diameter of 94.8 μm and 2.50 kg of first-sieve-residual hydroxypropyl methyl cellulose having an average particle diameter of 175.0 μm. The treatment rate in the first sieving step was 34.1 kg/hr/m$^2$.

Subsequently, 2.50 kg of the obtained first-sieve-residual hydroxypropyl methylcellulose was pulverized by a batch type vibration mill (manufactured by Chuo Kakohki Co., Ltd.) to obtain 2.50 kg of a second pulverization product having a water content of 2.1% by mass and an average particle diameter of 120.2 μm.

The obtained second pulverization product (2.50 kg) was supplied to a circular vibration type sieving machine (produced by DALTON Corporation) in which a stainless steel plain-woven wire mesh, as a sieve, having an effective sieve area of 0.33 m$^2$, opening of 0.178 mm and a wire diameter of 0.14 mm was installed at one stage. It was sieved under the conditions (frequency: 1500 rpm, weight phase angle: 50° and sieving time: 0.207 hours) into 1.98 kg of second-sieve-passed hydroxypropyl methyl cellulose having an average particle diameter of 96.2 μm and 0.53 kg of second-sieve-residual hydroxypropyl methyl cellulose having an average particle diameter of 190.5 μm. The treatment rate in the second sieving process was 29.0 kg/hr/m$^2$.

Then, the first-sieve-passed hydroxypropyl methyl cellulose and the second-sieve-passed hydroxypropyl methylcellulose were mixed to obtain hydroxypropyl methyl cellulose having an average particle diameter of 95.3 μm at yield of 97.9%. Pulverization conditions and results are shown in Table 1.

Regarding the resulting hydroxypropyl methyl cellulose, a DS of the methoxy groups and an MS of the hydroxypropoxy groups, a viscosity at 20° C. of the 2% by mass aqueous solution thereof, a loose bulk density, a tapped bulk density, a degree of compression, a volume fraction of long fibrous particles, a volume fraction of short fibrous particles, a volume fraction of spherical particles, a volume fraction of fine particles, the number of undissolved fibers having sizes of 8 to 200 μm as measured at 25° C. in 2 ml of a 0.1% by mass aqueous solution of the hydroxypropyl methyl cellulose by using an aperture tube with a diameter of 400 μm are shown in Table 2.

Example 3

In the same manner as in Example 2, 10.5 kg of first pulverization product having a water content of 2.0% by mass and an average particle diameter of 115.0 μm was obtained.

Then, the first pulverization product (10.5 kg) was supplied to a Gyro-Sifter GS-A1H (manufactured by TOKUJU Corporation) in which a sieve having a sieve surface coated with zirconium dioxide and having an effective sieve area of 0.14 m$^2$, opening of 0.178 mm and a wire diameter of 0.14 mm was installed in one stage. It was sieved under the conditions (half amplitude: 30 mm, frequency: 260 rpm and a sieving time: 2 hours) into 9.35 kg of first-sieve-passed hydroxypropyl methyl cellulose having an average particle diameter of 95.0 μm and 1.16 kg of first-sieve-residual hydroxypropyl methyl cellulose having an average particle diameter of 177.5 μm were obtained. The treatment rate in the first sieving step was 33.4 kg/hr/m$^2$.

Subsequently, 1.16 kg of the obtained first-sieve-residual hydroxypropyl methyl cellulose was pulverized by a batch type vibration mill (manufactured by Chuo Kakohki Co., Ltd.) to obtain 1.16 kg of second pulverization product having a water content of 2.0% by mass and an average particle diameter of 123.2 μm.

The obtained second pulverization product (1.16 kg) was supplied to a circular vibration type sieving machine (manufactured by DALTON Corporation) in which a sieve having a sieve surface coated with zirconium dioxide and having an effective sieving area of 0.33 m$^2$, opening of 0.178 mm and wire diameter of 0.14 mm was installed at one stage. It was sieved under the conditions (frequency: 1500 rpm, weight phase angle: 50° and sieving time; 0.090 hours) into 0.97 kg of second-sieve-passed hydroxypropyl methyl cellulose having an average particle diameter of 95.8 μm and 0.18 kg of second-sieve-residual hydroxypropyl methyl cellulose having an average particle diameter of 193.2 μm. The treatment rate in the second sieving step was 32.7 kg/hr/m$^2$.

Then, the first-sieve-passed hydroxypropyl methyl cellulose and the second-sieve-passed hydroxypropyl methyl cellulose were mixed to obtain hydroxypropyl methyl cellulose having an average particle diameter of 95.3 μm at yield of 98.3%. Pulverization conditions and result are as shown in Table 1.

Regarding the resulting hydroxypropyl methyl cellulose, a DS of the methoxy groups and an MS of the hydroxypropoxy groups, a viscosity at 20° C. of the 2% by mass aqueous solution thereof, a loose bulk density, a tapped bulk density, a degree of compression, a volume fraction of long fibrous particles, a volume fraction of short fibrous particles, a volume fraction of spherical particles, a volume fraction of fine particles, the number of undissolved fibers having sizes of 8 to 200 μm as measured at 25° C. in 2 ml of a 0.1% by mass aqueous solution of the hydroxypropyl methyl cellulose by using an aperture tube with a diameter of 400 μm are shown in Table 2.

Example 4

Alkaline cellulose produced by bringing having 1.00 parts by mass of wood pulp into contact with 2.10 parts by mass of a 49% by mass sodium hydroxide aqueous solution was reacted with 1.69 parts by mass of methyl chloride at a temperature of 60 to 90° C. for 2 hours in a pressure vessel with an internal stirrer, while stirring, to obtain a crude product of methyl cellulose (MC). Thereafter, the crude product of methyl cellulose was washed. Water was added thereto and mixed to obtain washed methyl cellulose having a water content of 67% by mass, and then dried to obtain starting methyl cellulose having a water content of 1.5% by mass.

The obtained starting methylcellulose (22.0 kg) was pulverized by a batch type vibration mill (manufactured by Chuo Kakohki Co., Ltd.) to obtain 22 kg of first pulverization product having a water content of 2.0% by mass and an average particle diameter of 125.0 μm.

Then, the obtained first pulverization product (22.0 kg) was supplied to a circular vibration type sieving machine (manufactured by DALTON Corporation) in which a sieve having a sieve surface coated with zirconium dioxide and having an effective sieve area of 0.33 m², opening of 0.213 mm and a wire diameter of 0.15 mm was installed at one stage. It was sieved under the condition (frequency: 1500 rpm, weight phase angle: 50° and sieving time: 2 hours) into 18.96 kg of first-sieve-passed methyl cellulose having an average particle diameter of 108.0 μm and 3.04 kg of first-sieve-residual methyl cellulose having an average particle diameter of 210.5 μm. The treatment rate in the first sieving step was 28.7 kg/hr/m².

Subsequently, 3.04 kg of the obtained first-sieve-residual methyl cellulose was pulverized by a batch type vibration mill (manufactured by Chuo Kakohki Co., Ltd.) to obtain 3.04 kg of a second pulverization product having a water content of 1.9% by mass and an average particle diameter of 126.3 μm.

The obtained second pulverization product was supplied to a circular vibration type sieving machine (manufactured by DALTON Corporation) in which a sieve having a sieve surface coated with zirconium dioxide and having an effective sieve area of 0.33 m², opening of 0.213 mm and a wire diameter of 0.15 mm was installed at one stage. It was sieved under the conditions (frequency: 1500 rpm, weight phase angle: 50°, sieving time: 0.251 hours) into 2.28 kg of second-sieve-passed methyl cellulose having an average particle diameter of 110.5 μm and 0.76 kg of second-sieve-residual methyl cellulose having an average particle diameter of 230.4 μm. The treatment rate in the second sieving step was 27.5 kg/hr/m².

Then, the first-sieve-passed methyl cellulose and the second-sieve-passed methyl cellulose were mixed to obtain methyl cellulose having an average particle diameter of 108.8 μm at yield of 96.5%. Pulverization conditions and results are shown in Table 1.

Regarding the resulting methyl cellulose, a DS of the methoxy groups, a viscosity at 20° C. of the 2% by mass aqueous solution thereof, a loose bulk density, a tapped bulk density, a degree of compression, a volume fraction of long fibrous particles, a volume fraction of short fibrous particles, a volume fraction of spherical particles, a volume fraction of fine particles, the number of undissolved fibers having sizes of 8 to 200 μm as measured at 5° C. in 2 ml of a 0.1% by mass aqueous solution of the methyl cellulose by using an aperture tube with a diameter of 400 μm are shown in Table 2.

Comparative Example 1

In the same manner as in Example 1, 0.15 kg of first pulverization product having a water content of 2.1% by mass and an average particle diameter of 122.0 μm was obtained.

Then, the obtained first pulverization product (0.15 kg) was supplied to a Ro-Tap type sieve shaker (manufactured by Takeda Rika Kogyo Co., Ltd.) in which a stainless-steel plain-woven wire mesh (produced by Kansai Wire Netting Co., Ltd.), as a sieve, having an effective sieve area of 0.025 m², opening of 0.213 mm and a wire diameter of 0.15 mm, Kansai wire mesh was installed at one stage. It was sieved under conditions (number of shaking: 250 rpm, number of tapping: 67 times/minute, shaking width: 50 mm, sieving time: 0.30 hours) into 0.113 kg of first-sieve-passed hydroxypropyl methyl cellulose having an average particle diameter of 106.0 μm and 0.037 kg of first-sieve-residual hydroxypropyl methyl cellulose having an average particle diameter of 182.5 μm. The treatment rate in the first sieving step was 15.1 kg/hr/m², and the yield of hydroxypropyl methyl cellulose was 75.3%. Pulverization conditions and results are as shown in Table 1.

Regarding the resulting hydroxypropyl methyl cellulose, a DS of the methoxy groups and an MS of the hydroxypropoxy groups, a viscosity at 20° C. of the 2% by mass aqueous solution thereof, a loose bulk density, a tapped bulk density, a degree of compression, a volume fraction of long fibrous particles, a volume fraction of short fibrous particles, a volume fraction of spherical particles, a volume fraction of fine particles, the number of undissolved fibers having sizes of 8 to 200 μm as measured at 25° C. in 2 ml of a 0.1% by mass aqueous solution of the hydroxypropyl methyl cellulose by using an aperture tube with a diameter of 400 μm are shown in Table 2.

Compared to Example 1, the sieving conditions in the first sieving step were the same, but the treatment rate and yield were low.

Comparative Example 2

In the same manner as in Example 2, 25.0 kg of first pulverization product having a water content of 1.9% by mass and an average particle diameter of 115.0 μm was obtained.

Then, the obtained first pulverization product (25.0 kg) was supplied to a circular vibration type sieving machine (manufactured by DALTON Corporation) in which a stainless steel plain-woven wire mesh (produced by Kansai Wire Netting Co., Ltd.), as a sieve, having an effective sieve area of 0.33 m², opening of 0.178 mm and a wire diameter of 0.14 mm was installed at one stage. It was sieved under the conditions (frequency: 1500 rpm, weight phase angle: 50°, sieving time: 2 hours) into 20.75 kg of first-sieve-passed hydroxypropyl methyl cellulose having an average particle diameter of 94.8 μm and 4.25 kg of first-sieve-residual hydroxypropyl methyl cellulose having an average particle diameter of 162.5 μm. The treatment rate in the first sieving step was 31.4 kg/hr/m².

Then, the first-sieve-residual hydroxypropyl methyl cellulose was pulverized by a batch type vibration mill (manufactured by Chuo Kakohki Co., Ltd.) to obtain 4.25 Kg of second pulverization product having a water content of 2.1% by mass and an average particle diameter of 117.2 μm.

The obtained second milling product (4.25 kg) was supplied to a circular vibration type sieving machine (manufactured by DALTON Corporation) in which a stainless steel plain-woven wire mesh, as a sieve, having an effective sieve area of 0.33 m², opening of 0.178 mm and a wire diameter of 0.14 mm was installed at one stage. It was sieved under the conditions (frequency: 1500 rpm, weight phase angle: 50°, sieving time: 0.348 hours) into 3.27 kg of the second-sieve-passed hydroxypropyl methyl cellulose having an average particle diameter of 94.9 μm and 0.98 kg of the second-sieve-residual hydroxypropyl methyl cellulose e having an average particle diameter of 178.0 μm. The treatment rate in the second sieving step was 28.5 kg/hr/m².

Then, the first-sieve-passed hydroxypropyl methyl cellulose and the second-sieve-passed hydroxypropyl methyl cellulose were mixed to obtain hydroxypropyl methyl cellulose having an average particle diameter of 95.0 μm at yield of 96.1%. Pulverization conditions and results are shown in Table 1.

Regarding the resulting hydroxypropyl methyl cellulose, a DS of the methoxy groups and an MS of the hydroxypropoxy groups, a viscosity at 20° C. of the 2% by mass aqueous solution thereof, a loose bulk density, a tapped bulk density, a degree of compression, a volume fraction of long fibrous particles, a volume fraction of short fibrous particles, a volume fraction of spherical particles, a volume fraction of fine particles, the number of undissolved fibers having sizes of 8 to 200 μm as measured at 25° C. in 2 ml of a 0.1% by mass aqueous solution of the hydroxypropyl methyl cellulose by using an aperture tube with a diameter of 400 μm are shown in Table 2.

Compared to Example 2, the treatment rate in the first sieving step was decreased. Further compared with Example 2, the amount of the first-sieve-residual hydroxypropyl methyl cellulose was large, so that an increase in the number of undissolved fibers was observed due to excess pulverization in the second pulverization step.

Comparative Example 3

In the same manner as in Example 4, 22.0 kg of first pulverization product having a water content of 1.9% by mass and an average particle diameter of 125.0 μm was obtained.

The obtained first pulverization product (22.0 kg) was supplied to a circular vibration type sieving machine (manufactured by DALTON Corporation) in which a stainless steel plain-woven wire mesh, as a sieve, having an effective sieve area of 0.33 m², opening of 0.213 mm and a wire diameter of 0.15 mm was installed at one stage. It was sieved under conditions (frequency: 1500 rpm, weight phase angle: 50° and sieving time: 2 hours) into 16.28 kg of first-sieve-passed methyl cellulose having an average particle diameter of 106.9 μm and 5.72 kg of first-sieve-residual methyl cellulose having an average particle diameter of 190.5 μm. The treatment rate in the first sieving step was 24.7 kg/hr/m².

Then, the obtained first-sieve-residual methyl cellulose (5.72 kg) was pulverized by a batch type vibration mill (manufactured by Chuo Kakohki Co., Ltd.) to obtain 5.72 kg of second pulverization product having a water content of 2.3% by mass and an average particle diameter of 129.3 μm.

The obtained second pulverization product (5.72 kg) was supplied to a circular vibration type sieving machine (manufactured by DALTON Corporation) in which a stainless steel plain-woven wire mesh, as a sieve, having an effective sieving area of 0.33 m², opening of 0.213 mm and a wire diameter of 0.15 mm was installed at one stage. It was sieved under the conditions (frequency: 1500 rpm, weight phase angle of 50° and sieving time: 0.537 hours) into 4.15 kg of second-sieve-passed methyl cellulose having an average particle diameter of 109.3 μm and 1.57 kg of second-sieve-residual methyl cellulose having an average particle diameter of 201.2 μm. The treatment rate in the second sieving step was 23.4 kg/hr/m².

Then, the first-sieve-passed methyl cellulose and the second-sieve-passed methylcellulose were mixed to obtain methyl cellulose having an average particle diameter of 107.5 μm at yield of 92.9%. Pulverization conditions and results are shown in Table 1.

Regarding the resulting methyl cellulose, a DS of the methoxy groups, a viscosity at 20° C. of the 2% by mass aqueous solution thereof, a loose bulk density, a tapped bulk density, a degree of compression, a volume fraction of long fibrous particles, a volume fraction of short fibrous particles, a volume fraction of spherical particles, a volume fraction of fine particles, the number of undissolved fibers having a size of 8 to 200 μm as measured at 5° C. in 2 ml of a 0.1% by mass aqueous solution of the methyl cellulose by using an aperture tube with a diameter of 400 μm are shown in Table 2.

Compared to Example 4, the treatment rate in the first sieving step was decrease. Further compared with Example 4, the amount of the first-sieve-residual methyl cellulose was large, so that an increase in the number of undissolved fibers was observed due to excess pulverization in the second pulverization step.

TABLE 1

| | starting waster-soluble cellulose ether | first pulverization product | | first sieving step | | | second pulverization product | | second sieving steep | | |
|---|---|---|---|---|---|---|---|---|---|---|---|
| | | water content (mass %) | average particle size (μm) | Inorganic metal compound applied to sieve surface | sieving machine | treatment rate (kg/hr/m²) | water content (mass %) | average particle size (μm) | Inorganic metal compound applied to sieve surface | sieving machine | treatment rate (kg/hr/m²) |
| Example1 | HPMC | 2.1 | 122.0 | zirconium oxide and titanium oxide | Ro-Tap shaker | 18.1 | — | — | — | — | — |
| Example2 | HPMC | 2.0 | 115.0 | zirconium oxide | vibration | 34.1 | 2.1 | 120.2 | — | vibration | 29.0 |
| Example3 | HPMC | 2.0 | 115.0 | zirconium oxide | in-plain motion | 33.4 | 2.0 | 123.2 | zirconium oxide | vibration | 32.7 |
| Example4 | MC | 2.0 | 125.0 | zirconium oxide | vibration | 28.7 | 1.9 | 126.3 | zirconium oxide | vibration | 27.5 |
| Comp.Ex.1 | HPMC | 2.1 | 122.0 | — | Ro-Tap shaker | 15.1 | — | — | — | — | — |
| Comp.Ex.2 | HPMC | 1.9 | 115.0 | — | vibration | 31.4 | 2.1 | 117.2 | — | vibration | 28.5 |
| Comp.Ex.3 | MC | 1.9 | 125.0 | — | vibration | 24.7 | 2.3 | 129.3 | — | vibration | 23.4 |

TABLE 2

| | sieve-passed water-soluble cellulose ether | | | | | | | | | | | |
|---|---|---|---|---|---|---|---|---|---|---|---|---|
| | average particle size (μm) | methoxy (DS) | hydroxy-propoxy (MS) | viscosity *1 (mPa · S) | loose bulk density (g/ml) | tapped bulk density (g/ml) | degree of compaction (%) | long fibrous particles (%) | short fibrous particles (%) | spherical particles (%) | fine particles (%) | number of insoluble fibers | yield (%) |
| Example1 | 110.0 | 1.80 | 0.15 | 16000 | 0.21 | 0.34 | 37.5 | 41.0 | 20.6 | 37.1 | 1.3 | 350 | 90.7 |
| Example2 | 95.3 | 1.82 | 0.24 | 9500 | 0.29 | 0.41 | 29.3 | 31.8 | 14.7 | 52.5 | 1.0 | 110 | 97.9 |
| Example3 | 95.3 | 1.82 | 0.24 | 9550 | 0.29 | 0.41 | 30.1 | 32.9 | 13.9 | 52.4 | 0.8 | 125 | 98.3 |
| Example4 | 108.8 | 1.81 | — | 7800 | 0.22 | 0.34 | 35.9 | 40.4 | 20.9 | 37.6 | 1.1 | 580 | 96.5 |
| Comp.Ex.1 | 106.0 | 1.79 | 0.15 | 15800 | 0.22 | 0.35 | 36.2 | 38.2 | 20.0 | 40.1 | 1.7 | 360 | 75.3 |
| Comp.Ex.2 | 95.0 | 1.82 | 0.24 | 9300 | 0.30 | 0.43 | 29.4 | 29.5 | 12.5 | 56.6 | 1.4 | 230 | 96.1 |
| Comp.Ex.3 | 107.5 | 1.81 | — | 7500 | 0.23 | 0.36 | 35.7 | 36.5 | 22.4 | 39.6 | 1.5 | 830 | 92.9 |

*1 viscosity at 20° C., as determined in a 2% by mass aqueous solution of the water-soluble cellulose ether.

The invention claimed is:

1. A method for producing a sieved water-soluble cellulose ether, comprising:
   a first pulverization step of pulverizing a water-soluble cellulose ether to obtain a first pulverization product, and
   a first sieving step of sieving the first pulverization product by using a first sieve whose mesh surface is coated with an inorganic metal compound to obtain a first-sieve-passed water-soluble cellulose ether.

2. The method for producing a sieved water-soluble cellulose ether according to claim 1, further comprising
   a second pulverization step of pulverizing a first-sieve-residual water-soluble cellulose ether remaining on the first sieve to obtain a second pulverization product, and
   a second sieving step of sieving the second pulverization product by using a second sieve whose mesh surface may or may not be coated with an inorganic metal compound to obtain a second-sieve-passed water-soluble cellulose ether.

3. The method for producing a sieved water-soluble cellulose ether according to claim 1, wherein the inorganic metal compound is selected from the group consisting of titanium compounds, zirconium compounds, hafnium compounds, nickel compounds, chromium compounds, tungsten compounds, aluminum compounds, and molybdenum compounds.

4. The method for producing a sieved water-soluble cellulose ether according to claim 1, wherein the inorganic metal compound has a coating thickness of from 50 to 1000 nm.

5. The method for producing a sieving water-soluble cellulose ether according to claim 1, wherein the water-soluble cellulose ether is selected from the group consisting of an alkyl cellulose, a hydroxyalkyl cellulose, and a hydroxyalkyl alkyl cellulose.

* * * * *